United States Patent [19]

Ahmed et al.

[11] Patent Number: 5,602,885
[45] Date of Patent: Feb. 11, 1997

[54] AUTOMATED GIRTH WELD INSPECTION OF NUCLEAR FUEL RODS

[75] Inventors: Hassan J. Ahmed, Ermo; Rhonda L. Pautler, Columbia; Renny Lacy, Lexington, all of S.C.

[73] Assignee: Westinghouse Electric Corporation, Pittsburgh, Pa.

[21] Appl. No.: 519,212

[22] Filed: Aug. 25, 1995

[51] Int. Cl.$^6$ .................................................. G21C 17/00
[52] U.S. Cl. .................... 376/248; 376/249; 376/451; 376/457; 376/261; 376/245; 376/258
[58] Field of Search .................... 376/248, 249, 376/451, 457, 261, 245, 258; 976/DIG. 214; 73/618, 620, 622, 800, 808

[56] References Cited

U.S. PATENT DOCUMENTS

| | | | |
|---|---|---|---|
| 4,541,055 | 9/1985 | Wolfe et al. | 364/474 |
| 4,554,128 | 11/1985 | Parker et al. | 376/252 |
| 4,822,987 | 4/1989 | Goldfield et al. | 235/462 |
| 4,857,260 | 8/1989 | Schoenig, Jr. et al. | 376/245 |
| 4,957,691 | 9/1990 | Brashier et al. | 376/245 |
| 5,147,047 | 9/1992 | Ahmed et al. | 209/538 |
| 5,186,887 | 2/1993 | Yaginuma | 376/248 |
| 5,309,486 | 5/1994 | Lichauer et al. | 376/248 |
| 5,435,478 | 7/1995 | Wood et al. | 228/42 |

*Primary Examiner*—Charles T. Jordan
*Assistant Examiner*—Meena Chelliah

[57] ABSTRACT

The girth welds joining the end plugs and the hollow tubes of nuclear fuel rods are inspected automatically using a technique that averages reflectance values, compares the reflectance values to standards defined as proportions of the average, and counts adjacent pixels outside the standards to analyze for defects exceeding a minimum defect size. The minimum defect size is checked by counting the adjacent pixels in mutually perpendicular directions, such as rows and columns in the collected matrix of pixel data. The maximum count in the two directions can be different, for profiling the maximum acceptable defect as to the direction of its extension relative to the tube and/or weld. Tubes are inspected prior to surface treatments that may conceal defects. The tube is fed, illuminated and rotated for at least one revolution at an inspection station, collecting line scans at regular angles synchronously with rotation using a line scan camera coupled to a digitizer to obtain the matrix of data encompassing the girth weld. A numerical processor averages, compares and counts the number of adjacent pixels for assessing weld quality.

12 Claims, 3 Drawing Sheets

AUTOMATED GIRTH WELD INSPECTION OF NUCLEAR FUEL RODS

BACKGROUND OF THE INVENTION

1. Field of the Invention

The invention relates to the field of optical inspection systems for assessing the quality of welds. In particular, the invention concerns an automated part handling and image processing system responsive to sharply localized variations in reflectance, for selecting, rejecting and/or monitoring the quality of girth welds on nuclear fuel tubes.

2. Prior Art

Nuclear fuel is packaged in long narrow stacks of enriched uranium pellets carried in zirconium alloy tubes. The tubes are plugged at the ends and sealed, and in addition to the pellets, contain an inert gas. A number of such tubes are mounted parallel to one another in a fuel assembly having supporting grids spaced along the tubes, with receptacles holding the tubes parallel to one another and at a space sufficient to admit control rods that are movable into spaces between the tubes for damping nuclear flux.

Zirconium is similar to aluminum in that it is a malleable metal that develops an oxide film or coating on surfaces exposed to oxygen, the coating generally forming a barrier that protects the metal underneath. When subjected to heating in oxygen or in water (for example when used in a reactor for generating heat), the oxide coating thickens and the tube becomes black, the rate of oxidation being related to the temperature and time of heating and the availability of oxygen. Zirconium alloy (e.g., Zircalloy) is a preferred material for fuel rods because it presents a low cross section to nuclear particles such as neutrons and therefore does not in turn become a strong source of nuclear radiation when it is irradiated.

Oxidation of the fuel rod tubes is advantageous because a thick oxide coating protects the tubes, giving them a harder surface. Reactor coolant pumps and convection currents in an operating reactor produce a powerful and turbulent flow of coolant in pressurized water reactors and boiling water reactors. The flow can carry along pieces of metal and the like, which can impact against the fuel rod tubes. It is important to avoid a breach in the walls of the fuel rod tubes, which can lead to release of radioactive material into the coolant. Oxidized tubes are harder and less subject to fretting damage from debris carried along in the reactor coolant.

The tubes are particularly vulnerable to fretting damage when they are new and relatively unoxidized. The tubes are also vulnerable on their surfaces immediately adjacent to the supporting grids of the fuel assembly on the upstream side relative to coolant flow. Loose debris in the coolant can be caught by the supporting grids and fretted against the tubes in this area. Such fretting damage to the tubes has been found to occur most often on the upstream side of the foremost supporting grid of the fuel assembly, which is the lowermost grid due to the upward flow path of the coolant, namely at the lower end of the fuel rod tube.

To combat the danger of fretting damage at the upstream end of the tubes, it has been proposed to treat the tubes preliminarily at their upstream ends, for example along the lowermost six or eight inches (15–20 cm), to protect the tubes from fretting damage. U.S. Pat. No. 5,171,520 —Bryan et al proposes to coat the tubes with zircon, a hard refractory material ($ZrSiO_4$) also known as zirconium silicate. U.S. Pat. No. 5,265,137 —Busch proposes to treat at least the ends of tubes by heating them with one or more of carbon, nitrogen and oxygen to form a protective layer.

During production, an end plug is welded to the fuel rod tube, which can be an automated process as disclosed in U.S. Pat. 4,857,260 —Schoenig, Jr. et al. The fuel pellets are loaded, together with an inert gas, and the opposite end plug is welded in place. The attachment of the end plugs to the tube is made along a circumferential line and the weld is termed a girth weld. Typically, the fuel rods are visually inspected for quality, including for the integrity of the girth welds and other aspects such as dimensions.

Insofar as the tubes or the ends of the tubes are treated for surface hardness by oxidizing and thereby blackening the tubes, or by applying a protective coating, the girth welds are obscured. It is possible to inspect the tube ends using X-rays, which are not sensitive to the appearance of the surface. Such a technique is disclosed in U.S. Pat. No. 4,957,691 —Brashier et al. For optimal visual inspection, it is appropriate to inspect the tubes before such treatments, and preferably immediately before, so that the potential for handling damage between inspection and treatment is minimal.

It would be advantageous to automate the production of fuel rods as much as practicable, including the inspection of the tubes. Automated handling and processing steps, however, are generally inconsistent with visual inspection for dimensions, defects, weld quality and the like.

The present invention seeks to provide an automated technique for optical inspection of girth welds which can be accomplished with minimal handling steps using a compact apparatus that rotates the tube on its longitudinal axis while pixel data is collected by a line scan camera triggered by a shaft angle encoder coupled to the tube rotation drive. Each scan line is digitized, obtaining a line of pixel data over a longitudinal length encompassing the girth weld, and the scans are collected at equally spaced angular positions around the tube. The invention further seeks to analyze reflectance data on the tube in the area of the weld, in a manner that amplifies the system's reaction to local flaws that are equal to or larger than a predetermined minimum, by determining the average value of a number of pixels and counting the number of adjacent pixels, in two mutually perpendicular directions, which exceed the average reflectance value by a predetermined proportion (i.e., profiling defects parallel to the axis of the tube and along a circumference). The number of pixels and their pitch or spacing corresponds to the minimum flaw size, profiled in the X and Y directions in the collected matrix of pixel data. The image is thereby analyzed for detection missing or gapped welds, automatically determining the quality of the plug/tube seam.

SUMMARY OF THE INVENTION

It is an object of the invention to facilitate the automatic inspection of plug-to-tube girth welds in nuclear fuel rods, using a compact apparatus that is readily integrated into an automatic manufacturing process.

It is also an object of the invention m reduce quality assurance reliance on visual manual inspection of fuel rods, particularly such that inspection can be conducted prior to protective process steps that would obscure defects in a girth weld.

It is another object of the invention to discriminate for local defects in girth welds using an averaging and X-Y profiling technique that emphasizes sensitivity to optically detectable variations equal to or greater than a predetermined size in one or both perpendicular directions.

It is also an object of the invention to examine a girth weld with sensitivity to variations around a circumference, while rotating the robe to collect pixel data in circumferential lines or slices.

It is still another object of the invention to detect missing welds or gaps.

These and other objects are accomplished by a method and apparatus for the inspection of girth welds joining the end plugs to the tubes of nuclear fuel rods. The welds are inspected automatically using a technique that sums reflectance values to examine a predetermined number of pixels in one direction (e.g., along the tube axis) to test for minimum defect width, and then perpendicularly to test for minimum defect length (around the circumference), whereby defects at least as large as the minimum defect size are emphasized and smaller defects are de-emphasized. The minimum defect size can be different in the two perpendicular directions, for example with the maximum acceptable reflectance variation spanning three pixels in width and ten pixels in length.

The plug is welded to the tube along a circumferential girth weld in a plane perpendicular m a longitudinal axis of the tube. The girth weld area is illuminated and rotated for at least one revolution at an inspection station, for example prior to oxidation treatments of the tube that may conceal defects. A line scan camera coupled to a digitizer collects repetitive scans during rotation, preferably scanning parallel to the longitudinal axis of the tube and being triggered by a shaft angle encoder at regular angular positions. A matrix of reflectance data is thus collected at and adjacent to the girth weld, including numeric reflectance values of rows of pixels along a longitudinal length of the tube spanning the weld, and columns of pixels along circumferences of the tube. A processor sums the predetermined number of pixels in columns (i.e., circumferential segments) for a measure of the average reflectance over an area the size of the minimum defect size and compares the sum or average to a selection standard for accepting or rejecting the tubes and welds. Adjacent pixels that exceed the average reflectance value of the matrix by a predetermined proportion (e.g., 75%) are counted in the X and Y directions. The standard deviation of the average and other factors can also be examined. Preferably, the entire matrix of pixel data is averaged to calculate the reflectance setpoints. The calculations also can be made in a running average manner contemporaneously with collection of the reflectance values and with rotation of the tube.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
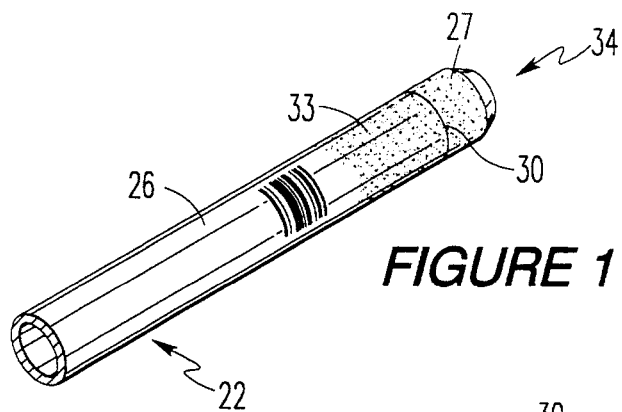
FIG. 1 is a partial perspective view showing one girth welded end of a finished nuclear fuel rod.

As shown in FIG. 1, a finished fuel rod 22 generally comprises a hollow zirconium alloy tube 26, filled with uranium pellets and closed by an end plug 27 welded to tube 26 along a circumferential girth weld 30. The fuel rod 22 preferably is provided with a surface finish 33 for protecting at least an upstream end 34 of fuel rod 22 from fretting damage caused by loose debris captured from circulating coolant in a reactor by a fuel rod support grid (not shown). This surface treatment 33 can comprise a layer of oxidized zirconium or some other protective coating or treatment. However, such a coating or treatment obscures the character and quality of girth weld 30. Therefore, the invention provides an automated procedure and apparatus for automatically inspecting girth welds, preferably prior to application of any protective coating or treatment.

Preferably, inspection is accomplished as a step in a production method having a number of substantially automated steps such as forming and cutting the tube, mechanically affixing and welding the end plug, loading the tube with nuclear fuel pellets (not shown), application of the protective coating or oxidation treatment, etc. Such an automated production technique is disclosed, for example, in U.S. Pat. No. 4,857,260 —Schoenig, Jr. et al., the disclosure of which is hereby incorporated.

Figure 2:
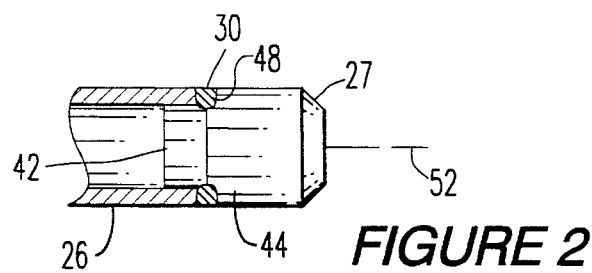
FIG. 2 is a partial longitudinal section view of the fuel rod in the area of the girth weld.

End plug 27 as shown in FIG. 2 has a plug portion 42 dimensioned to fit snugly within the end of tube 26, and a body portion 44 having a diameter equal to the outside diameter of tube 26. Body portion 44 forms a shoulder 48 with plug portion 44, which shoulder 48 abuts against the axial end of tube 26 prior to welding. The girth weld 30 extends circumferentially around the tube/plug abutment, in a plane perpendicular to a longitudinal axis 52 defined by tube 26. Girth weld 30 must be continuous around the circumference, for sealing tube 26 hermetically and for providing a durable assembly that can withstand extremes of temperature cycling over its useful life. Additionally, girth weld 30 must be precise, for properly attaching end plug 27 so as to form a continuous extension of tube 26. The girth weld is made in known manner, for example, using an electric arc welding technique in an inert atmosphere, e.g., of helium or argon.

According to the invention, girth weld 30 is inspected automatically, using an optical inspection method and apparatus that rely on variations in reflectance that are characteristic of weld defects vs. a lack of such variations characteristic of a continuous weld that lacks defects. The defects can be, for example, gaps or skips in the weld that extend wholly or partly around the circumference, blow holes that appear at the surface or the like. A weld missing all or part of its extension is potentially dangerous, and is preferably detected promptly after the welding procedure by which the weld was attempted. A properly formed weld is about one eighth inch (3.2 mm) wide, measured parallel to the longitudinal axis of the tube. A properly formed weld extends precisely to the outside diameter of the tube such that the junction of the tube to the plug appears the same as a continuous metal surface extending over the area of the weld.

Figure 3:
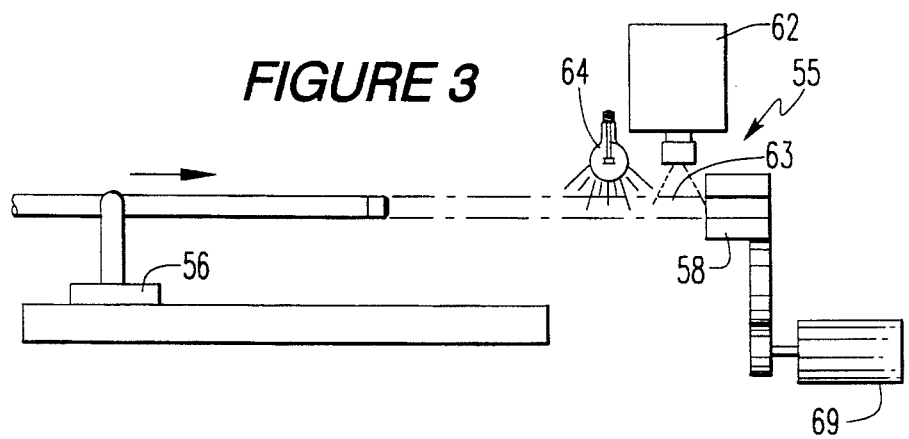
FIG. 3 is a schematic illustration of an inspection station according to the invention.

Referring to FIG. 3, the welded tube and plug assembly is fed to an inspection station 55, e.g., being advanced axially using a pneumatic slide cylinder 56, and engaged in a rotational fitting 58, which can have a pneumatic clamp for engaging and rotating the assembly. Girth weld 30 is disposed in the view field of a line scan camera 62 directed at an inspection zone 63 encompassing weld 30. Tube 26 and weld 30 preferably are illuminated at inspection zone 63 to enhance the level of reflectance over that produced by any ambient light, as generally shown by bulb 64 in FIG. 3. The tube and weld are engaged by a pneumatic tube grip 68 drivable by a rotational drive 69.

Tube 26 and plug 27 welded thereto are rotated about longitudinal axis 52 for at least one full revolution, and preferably by over one revolution, e.g., 1.1 revolutions or about 400°, while simultaneously collecting reflectance data using line scan camera 62. Line scan camera 62 has a field of view that encompasses a longitudinal span along tube 26 that bridges over the area of weld 30 and extends slightly beyond weld 30, both onto the surface of tube 26 and the surface of end plug 27.

Figure 4:
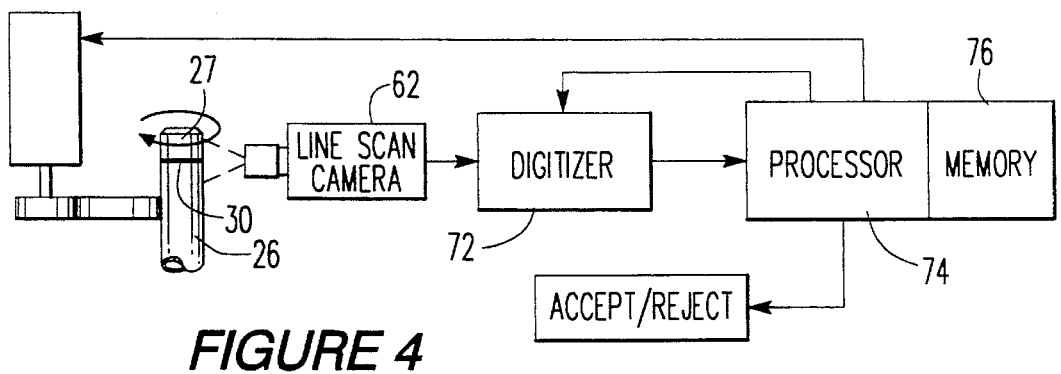
FIG. 4 is a schematic block diagram showing structural and functional interconnections according to the invention.

Line scan camera 62 can include a linear array of charge coupled devices (CCD sensors) on which an image of the fuel rod is focused by appropriate optics in a known manner. The charge coupled devices are periodically reset and otherwise accumulate charge during illumination as a function of the detected light level incident on each such element. The charge or voltage signals from each element can be shifted to an output of camera 62 after a predetermined brief interval sufficient to achieve contrast between discrete locations or "pixels" (picture elements) of relatively higher or lower reflectance of light from source of illumination 64. The signal line carrying the voltages indicative of reflectance levels is coupled to a digitizer 72 as shown in FIG. 4, which provides pixel data representing the respective voltage numerically, and therefore the gray scale reflectance level at each discrete location on the surface of the fuel rod represented by a pixel, extending along longitudinal axis 52 of the fuel rod by a distance equal to the span of line scan camera 62. This pixel data is loaded into a digital memory 76 and analyzed, for example by a processor 74.

The fuel rod can be rotated relatively slowly, for example at about one revolution per second, and/or line scan camera 62 can be operated at a high scan rate, to develop a large number of pixel line scans along lines parallel to axis 52 at regular angular positions around the axis to map a cylindrical span including weld 30. Preferably, each line scan is triggered by a pulse from a shaft angle encoder at regular angular steps, such that the speed and/or regularity of rotational speed are not critical.

Figure 5:
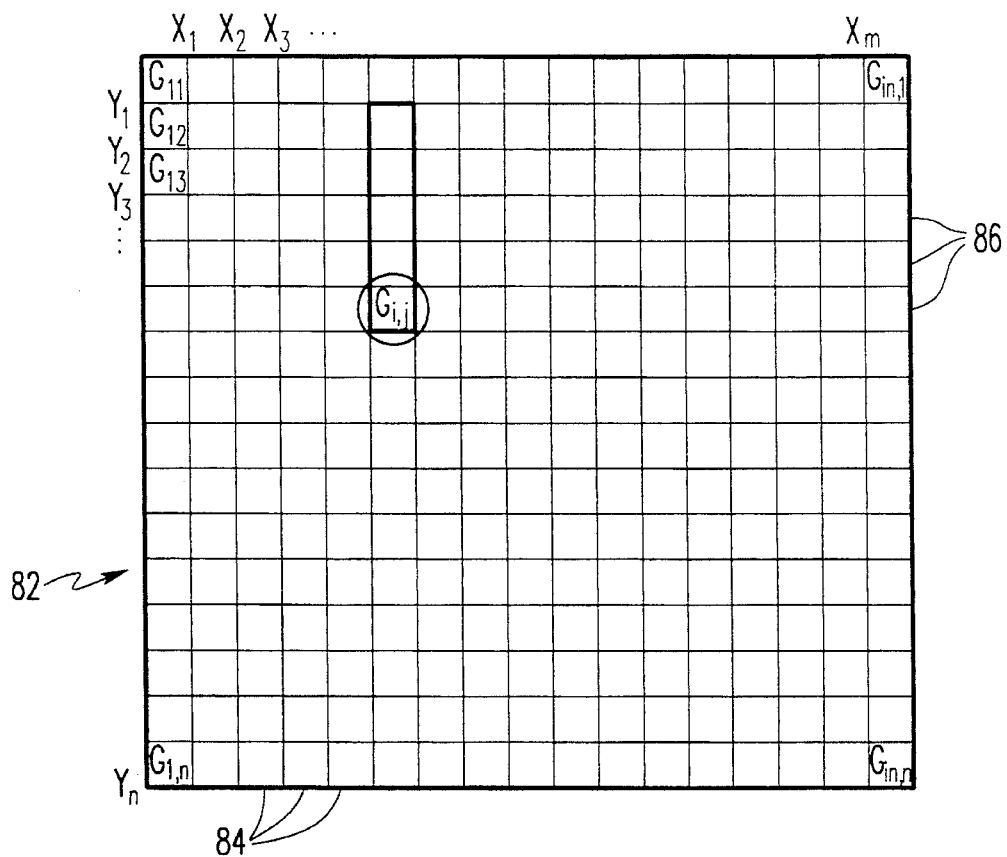
FIG. 5 is a chart representing a matrix of pixel reflectance data collected during rotation of the fuel rod through at least one revolution.
Figure 6:
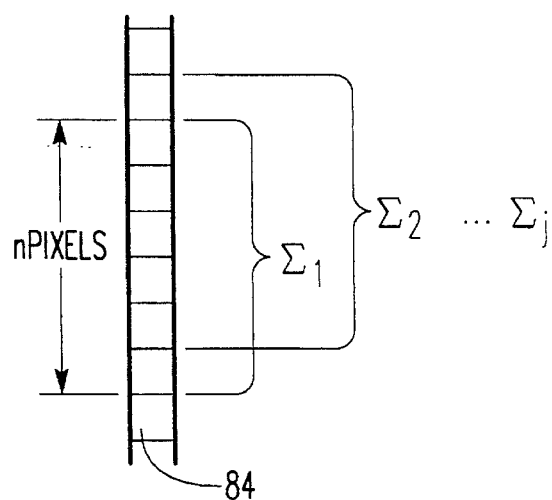
FIG. 6 is a schematic representation of taking successive running sums of a predetermined number "n" of pixels in columns as shown in FIG. 5.
Figure 7:
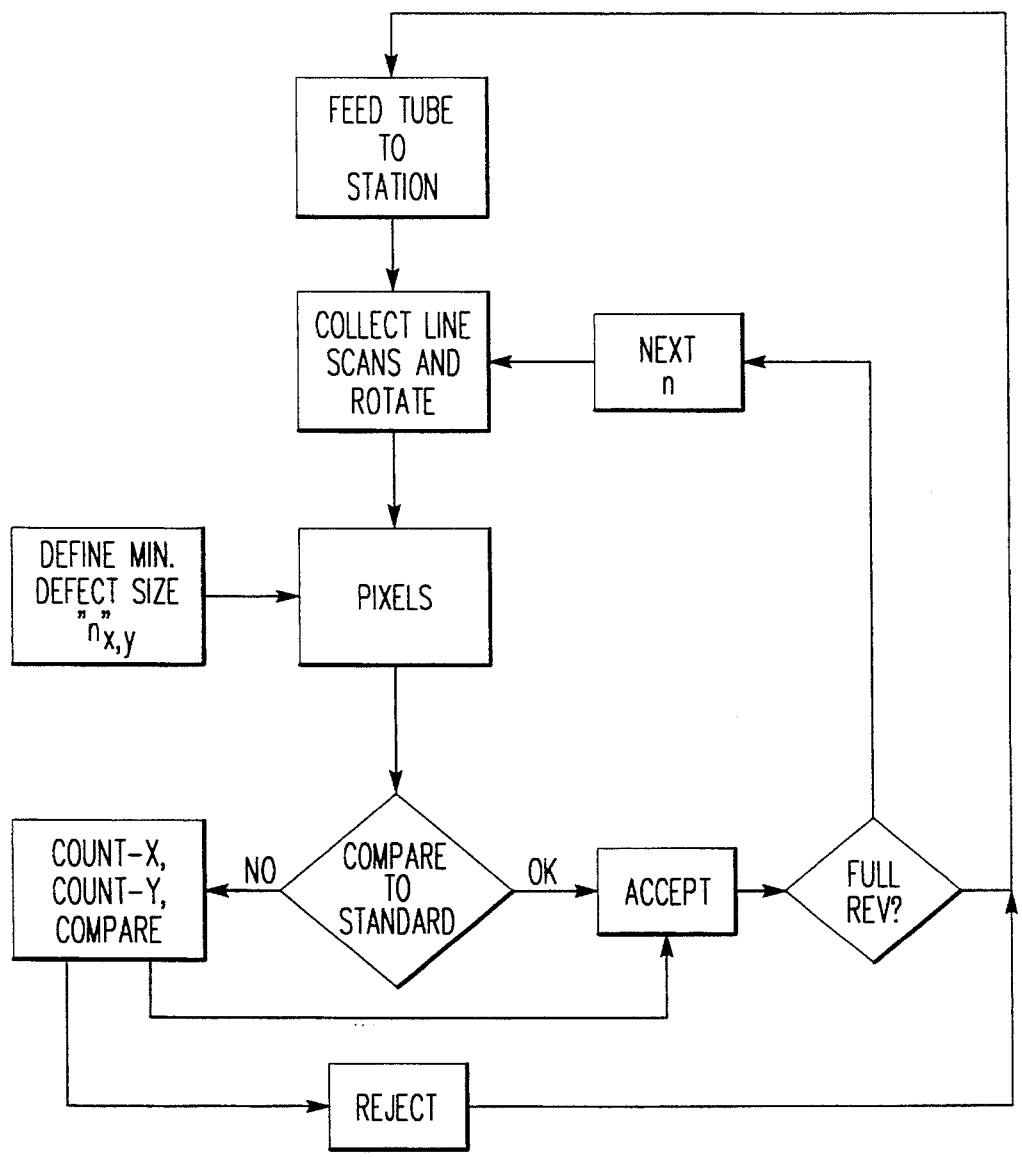
FIG. 7 is a flow chart showing the inspection and selection/rejection steps of the invention.

A matrix 82 of reflectance data is collected, as shown by the cells $G_{i,j}$ in FIG. 5, a portion of one column 84 thereof also being shown in FIG. 6. Matrix 82 includes numerical reflectance data for discrete pixels at and adjacent to girth weld 30, in rows 86 of pixels along a longitudinal length of the tube and columns 84 of pixels along adjacent circumferences of the tube within said longitudinal length.

It is possible to operate the motor 69 driving rotation of the fuel rod at a constant speed and to collect line scans at a regular frequency, thereby collecting matrix 82 of pixel data. Alternatively, motor 69 can be a stepping motor driven under control of processor 74 as shown in FIG. 4, with the processor triggering operation of digitizer 72, for positively positioning the fuel rod at regular angular intervals for recordation of line scans. As another alternative as discussed above, the fuel rod and/or driving motor can be coupled to a shaft angle encoder (not shown) that produces a pulse signal as a function of rotation of the fuel rod, which pulse signal triggers digitizer 72 and/or line scan camera 62 to record a line of pixel data.

According to one embodiment, the tube rotation speed and scan rate are selected to achieve a single pixel resolution of about 0.0005 by 0.0005 inches (0.003 by 0.003 mm). For a fuel rod of about 2 cm (0.8 inch) outside diameter (i.e., 6.3 cm circumference), and a scan length of about 0.7 cm longitudinally, matrix 82 of pixel data is about 21K by 2K pixels. Each pixel can be encoded, for example, to eight bit gray scale resolution, or ±0.04% of full scale. The matrix 82 of numeric pixel reflectance data is analyzed by processor 74 or by similar numeric processors such as discrete adders, comparators or the like, to determine the quality and integrity of girth weld 30.

The inspection apparatus as described can be embodied with a Fairchild CAM 1500R or CAM 1830 line scan camera, either of which records a single line of 2,048 sensor cells or pixels per scan. Appropriate optics are provided for focusing the image of the fuel rod surface on the sensor cells.

According to an inventive aspect, the pixel data is analyzed in columns or circumferential slices on the fuel rod, in a manner that serves to emphasize or highlight defects and to de-emphasize reflectance variations between adjacent individual pixels. For this purpose, a minimum defect size is chosen, defined by the span of a predetermined number of adjacent pixels at the resolution of operation. For example, the minimum defect size can be chosen in the above example as 0.002 inches (0.05 mm), which is approximately the size of four adjacent pixels. The local average of the pixel data within this span of pixels is summed or averaged, and the result is compared to a stored or selected maximum and/or minimum value to assess whether a defect is present. This operation highlights defects that are at least as large as the minimum defect size.

Preferably, the minimum defect size is presettable to a different value in the X and Y directions (i.e., longitudinally of the tube across the width of the weld, and circumferentially around the tube). For example, the device can be more sensitive to the width of defects (along a longitudinal span of the tube), for example having a setpoint limit of three adjacent pixels of high reflectivity, and less sensitive to defects extending circumferentially around the tube, for example with the setpoint in that direction being ten adjacent pixels of high reflectivity. Accordingly, the defect testing is profiled in the X and Y directions to respond more strongly to particular kinds of defects.

More particularly, in analyzing the pixel data in matrix 82 (see FIGS. 5 and 6), proceeding for successive columns $X_1$ through $X_m$, and for each pixel value $G_{i,j}$ in each such column, each pixel value is compared to the average of the respective values of the pixels in the matrix. Any pixels exceeding the average reflectance, for example by 75% or more, are flagged. The adjacent flagged pixels are counted in X and Y directions and the count is compared to the respective maximums.

It is also possible to employ a running average of pixel values such as a column-wise local average that spans the minimum defect size number of pixels "n".

This average is $$G_{i,j} = {}_0^3 \Sigma G_{i,j+(n)}$$

Whereas the resulting sum or average is taken over the minimum expected defect size at and adjacent each pixel, variations that span at least this size show strongly in the sum or average. On the other hand, variations that span only one or more pixels of a smaller number than the predetermined number "n" show less strongly in the results due to the effect of translating the raw pixel data into running sums or averages spanning the predetermined number of adjacent pixels.

For translating the raw pixel data as described, it is possible to add the pixel values and divide by the number of pixels added (i.e., by the predetermined number), to obtain the actual average value using the same scale as the raw data. This is particularly convenient if the number of pixels is of a binary increment (e.g., four or eight), whereby the sum is simply shifted or the least significant bits are ignored. Alternatively, translating the pixel data can simply produce the sum of the values of the local pixels in the respective column, which is a form of averaging, albeit producing translated pixel values with a change of scale. For pixels at the edges of the matrix which are assured of being clear of the weld, the average or sum can be taken only up to that pixel that is within the predetermined number of the edge of the matrix. Alternatively, the average can be taken over the number of pixels remaining between the subject pixel and the edge (however, this effectively causes the minimum defect size to be smaller at the edges of the matrix, which is not desirable).

The reflectance value for the pixels is compared to at least one of a maximum and minimum reflectance standard preferably based on the average reflectance value over the matrix, and adjacent pixels having reflectances out of range are counted and compared to setpoints preferably defining an X-Y profiled standard, for reaching an accept/reject decision on the tube based on a result of said comparing.

Additional calculations can be made besides the comparison of individual pixel values to a preset proportion of the average value. The average reflectance value for all the pixels can be compared to a setpoint. The standard deviation can be required to be within specifications. It is also possible to calculate and record additional variables such as the maximum and minimum reflectance values, the average and standard deviation of the pixel values for each local group (e.g., line scan) and/or for the overall matrix, etc. These data are useful for adjusting the maximum and/or minimum reflectance specifications used to analyze the fuel rod welds. For example, if the source of illumination dims over time, this will be reflected by the overall average reflectance value. By adjusting the specifications as a function of the average, the specifications can be corrected over time to correspond to the variation in illumination.

Preferably, the digitizer, processor and memory functions of the apparatus are accomplished using image processing hardware having high throughput and the capability of processing steps such as local sums or averages, accumulation of overall averages and the like embodied in hardware. For example, the Max Video family of modular VME boards available from Data Cube, Inc. can be applied according to the invention for managing image acquisition from line scan camera 62, image storage, pixel processing including edge sensitivity, and other features such as the generation of statistical histograms and the like. This hardware is based on bus data transfers operable at a rate of 10 million pixel operations per second, which is easily capable of operation at the speed required to effect image collection and analysis as described, within the time available for inspection preferably less than or equal to the time required to produce the weld to be inspected. Accordingly, the analysis of the data can be accomplished substantially contemporaneously with its collection.

The line scan image that is repetitively collected and digitized from the output of the line scan camera encompasses a longitudinal portion of the tube including the girth weld. It is preferred to analyze the matrix pixel data through the individual line scans (i.e., counting adjacent high reflectivity pixels in scan rows) and aligning and counting adjacent high reflectivity pixels in the same position in successive scan lines. Thus, defects in the weld are detectable by reflectance variations widthwise along rows (longitudinally on the fuel rod), and also circumferentially around the tube. A detected reflectance variation over a first setpoint number of pixels (in an X or longitudinal direction) may be wide enough to be interpreted as a rejectable gap. Even if not wide enough to be rejectable, the defect may extend around the tube (in a Y or circumferential direction) sufficiently to form a rejectable gap as well. Moreover, the setpoint for the number of adjacent high reflectance pixels in the two profile directions can be related to one another, such that if a detect gap is wider then a shorter circumference setpoint is permitted, and vice-versa.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method for inspection of fuel rods, comprising a hollow tube and a plug welded to the hollow tube along a circumferential girth weld in a plane perpendicular to a longitudinal axis of the tube, the method comprising the steps of:

feeding the tube to an inspection station;

illuminating the tube at the inspection station;

rotating the tube about said axis for at least one full revolution;

collecting a matrix of reflectance data encompassing the girth weld during said rotating step, the matrix of reflectance data comprising numeric reflectance values of rows of pixels along a longitudinal length of the tube exceeding a longitudinal dimension of said girth weld, and columns of pixels around circumferences of the tube within said longitudinal length;

defining a minimum defect size of pixels in the girth weld, measured by a predetermined number of adjacent pixels in at least one of the rows and the columns;

determining an average of the reflectance values of at least a subset of the pixels;

comparing the average of the reflectance values of said pixels in the girth weld and respective adjacent pixels to at least one of a maximum and minimum reflectance standard; and accepting and rejecting the fuel rod based on a result of said comparing step.

2. The method of claim 1, wherein said determining of the average of the reflectance values includes averaging the reflectance values of the pixels in the matrix.

3. The method of claim 1, wherein said collecting includes repetitively digitizing an output of a line scan camera viewing a longitudinal portion of the tube including the girth weld.

4. The method of claim 3, wherein said collecting and digitizing are synchronized with rotation of the tube to provide line scans at angularly spaced positions.

5. The method of claim 1, further comprising calculating at least one of the maximum and minimum reflectance standard as a proportion of the average of the reflectance values and wherein said comparing includes comparing the reflectance values to said at least one of the maximum and minimum reflectance standard and counting adjacent pixels exceeding or not meeting the reflectance standard, respectively.

6. The method of claim 5, wherein said collecting, determining and comparing steps are conducted substantially contemporaneously.

7. The method of claim 5, further comprising defining a maximum number of adjacent pixels exceeding or not meeting the reflectance standard, and selecting and rejecting at least partly on a number of such adjacent pixels counted.

8. The method of claim 7, further comprising defining different maximum numbers of adjacent pixels in mutually perpendicular directions in the matrix.

9. An apparatus for inspection of fuel rods comprising a hollow tube and a plug welded to the hollow tube along a circumferential girth weld in a plane perpendicular to a longitudinal axis of the tube, the apparatus comprising:

- a tube handling system operable for feeding the tube to an inspection station and relatively rotating the tube at the inspection station about said axis, for at least one full revolution;
- means for illuminating the tube at the inspection station;
- a line scan camera coupled to a digitizer and a memory, for collecting a matrix of reflectance data encompassing the girth weld during relative rotation of the tube and the camera, the matrix of reflectance data comprising numeric reflectance values of rows of pixels along a longitudinal length of the tube exceeding a longitudinal dimension of said girth weld, and columns of pixels around circumferences of the tube within said longitudinal length, the columns of pixels representing successive scans of the line scan camera during relative rotation of the tube;
- numerical processing means coupled to at least one of the digitizer and the memory, the processing means determining an average of the reflectance values of the pixels at least for a predetermined number of adjacent pixels in the girth weld, determining at least one of a maximum and minimum reflectance value as a proportion of the average, and comparing the reflectance values of said pixels and to at least one of a maximum and minimum reflectance standard;
- the numerical processing means counting a number of adjacent pixels outside the at least one of a maximum and minimum reflectance standard, and comparing said number of adjacent pixels to a maximum count, for acceptance and rejection of the tube.

10. The apparatus of claim 9, wherein the numerical processing means is operable to count said adjacent pixels outside the at least one of the maximum and minimum reflectance standard, in mutually perpendicular directions in the matrix.

11. The apparatus of claim 10, wherein said adjacent pixels outside the at least one of the maximum and minimum reflectance standard are counted by the numerical processing means in rows corresponding to line scans and in columns corresponding to successive line scans.

12. The apparatus of claim 11 wherein the numerical processing means applies a different maximum count in the mutually perpendicular directions for profiling a maximum defect size relative to a direction of extension of the pixels.

* * * * *